UNITED STATES PATENT OFFICE.

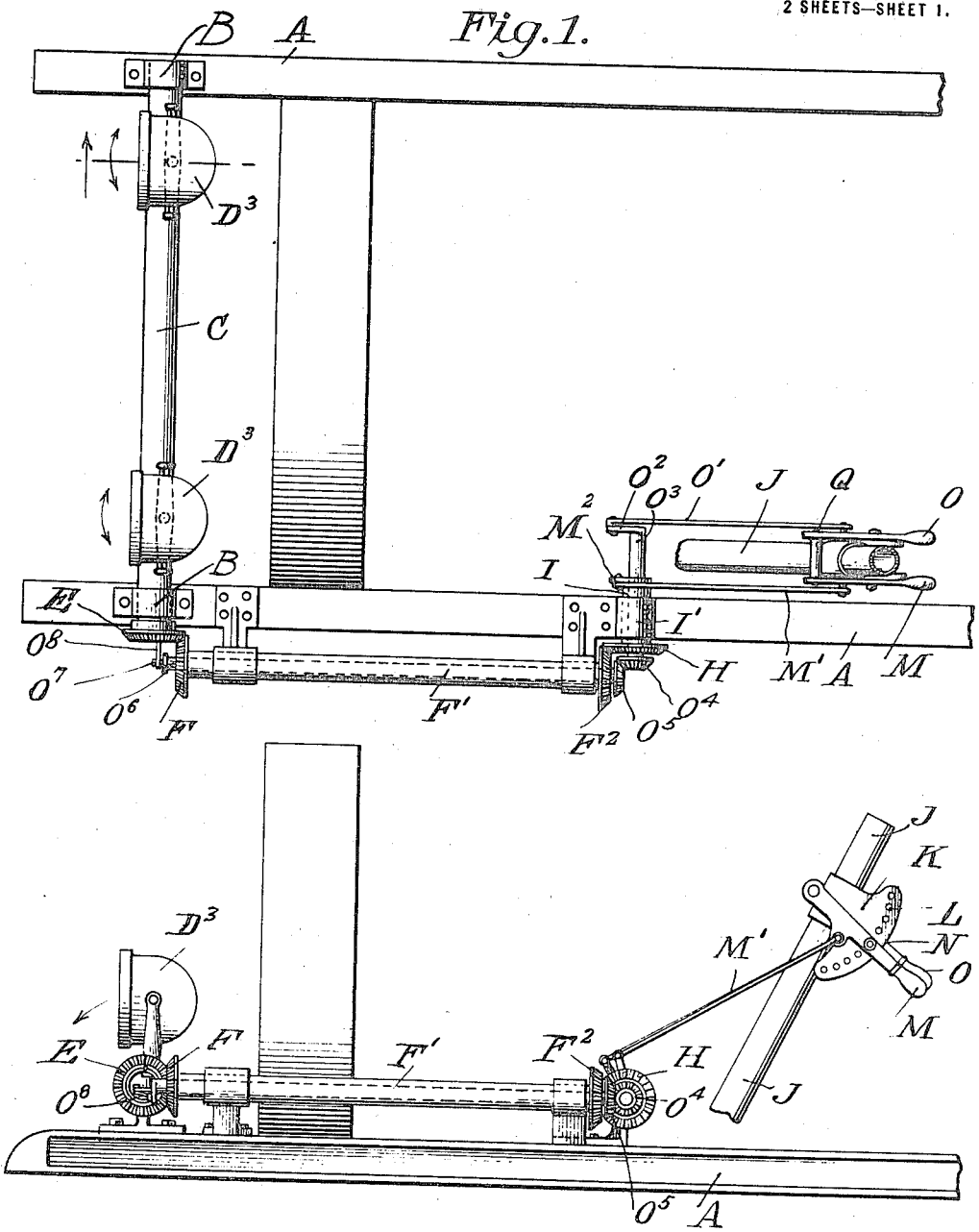

JOHN HENRY REED, OF VAN WERT, OHIO.

DIRIGIBLE LIGHT.

1,234,389.  Specification of Letters Patent.  Patented July 24, 1917.

Application filed November 25, 1916. Serial No. 133,402.

*To all whom it may concern:*

Be it known that I, JOHN H. REED, a citizen of the United States, residing at Van Wert, in the county of Van Wert and State of Ohio, have invented certain new and useful Improvements in Dirigible Lights; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dirigible lights for vehicles, etc., and consists of a means whereby the light carrying brackets may be given universal movements through the medium of a plurality of levers designed to actuate the mechanism.

The invention comprises various details of construction, combinations and arrangements of parts, which will be hereinafter fully described, shown in the accompanying drawings and then specifically defined in the appended claims.

My invention is illustrated in the accompanying drawings, which with the letters of reference marked thereon form a part of this specification, and in which:

Figure 1 is a top plan of my improved dirigible light.

Fig. 2 is a side elevation.

Figure 3:
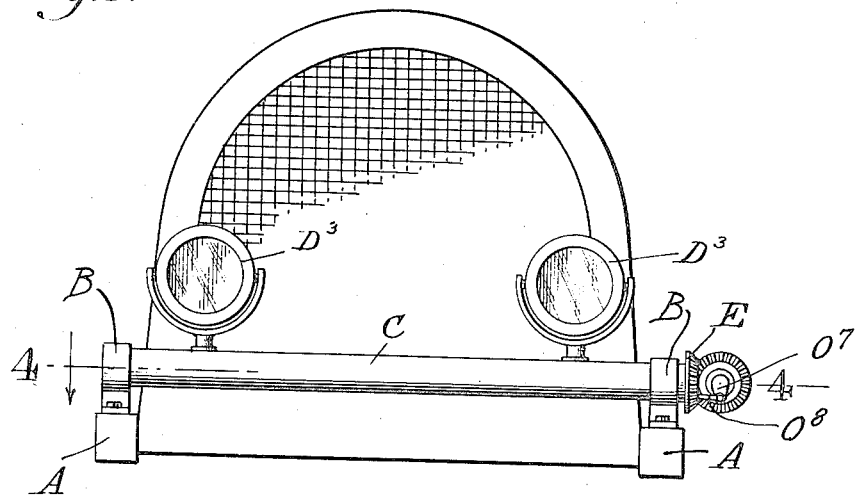
Fig. 3 is a front view.
Figure 4:
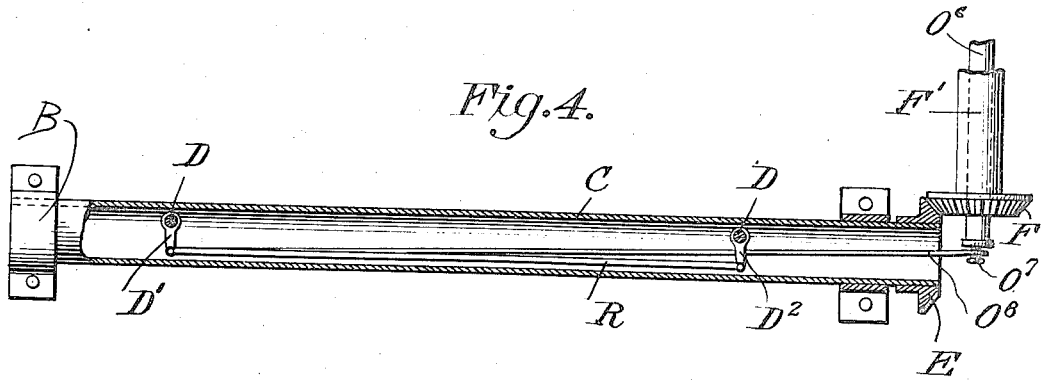
Fig. 4 is a detail view on line 4—4 of Fig. 1.
Figure 5:
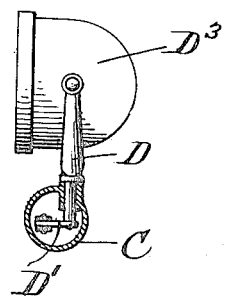
Fig. 5 is a view partly in section taken at right angles to the section of Fig. 4.

Reference now being had to the details of the drawings by letter, A designates the side bars of the frame of an automobile in connection with which the light is to be used, and B are bracket members forming bearings for supporting the hollow rock shaft C. Said shaft has journaled therein the shank portions of the bracket members D, carrying the lamps $D^3$, shown in section in Fig. 4 of the drawings, and to one of said bracket members is fastened a crank arm $D'$ and to the other a similar crank arm $D^2$. Fixed to the hollow shaft C is a beveled gear E which is in mesh with a similar beveled gear F fixed to the hollow shaft $F'$, which latter has a beveled gear $F^2$ at its other end in mesh with a beveled gear H fixed to the sleeve or hollow stub shaft I, journaled in the bearings $I'$ upon one of the beams A. A tubular shell J, shown in Figs. 1 and 2 of the drawings, is adapted to receive the steering shaft of the machine, and fastened to said shell are the segment plates K, having series of perforations L in the parallel portions thereof, adapted to be engaged by pins N carried by the two operating levers M and O, which levers are pivotally mounted upon the ends of a shaft Q. A rod $M'$ is pivotally connected at one end to the lever M and its other end is connected to an arm $M^2$ which is fixed to the sleeve I and forms means whereby, as the lever M is swung upon its pivot, the sleeve I will be rocked and, through the medium of the shafts $F'$ and C, which are geared thereto, will cause the latter to rock. The lever O is pivotally connected through the medium of the rod $O'$ with an arm $O^2$ fixed to a shaft $O^3$ which is journaled in the sleeve I and has a beveled gear $O^4$ fixed to its end, which is in mesh with a beveled gear $O^5$ fixed to the shaft $O^6$ which is mounted within the hollow shaft $F'$. A crank pin, designated by letter $O^7$, is fixed to the end of the shaft $O^6$ and has pivotal connection with one end of the rod $O^8$, shown clearly in Fig. 4 of the drawings, and which latter is pivoted to the arm $D'$. A rod R is pivoted at one end to the arm $D'$ and its other end to the arm $D^2$.

The operation of my invention will be readily understood and is as follows:— When it is desired to turn the lamps $D^3$ simultaneously in one direction or the other so as to throw the rays forward in a horizontal plane, the operator swings the lever O upon its pivot and which, through its connections with the rods fastened to the arms $D'$ and $D^2$, will cause the brackets to turn in the directions indicated by the arrow heads in Fig. 1 of the drawings. If it should be desired to rock the shaft C in order to cause the lights to tilt therewith to throw the rays downwardly or upwardly, it may be done by the operator swinging the lever M upon its pivot and which, through the connection of the sleeve I with the shafts $F'$ and C, may cause the latter to rock.

What I claim to be new is:—

1. In combination with the side bars of an automobile, a hollow rock shaft journaled thereon, lights pivotally mounted in said shaft and adapted to tilt as the shaft is rocked, an operating lever and connections between the same and said shaft for rocking the same, and means for turning the lights independent of said shaft.

2. In combination with the side bars of an automobile, a hollow rock shaft journaled thereon, lamp brackets journaled in said shaft, a second hollow rock shaft mounted upon one of the side bars, gear connections between the shafts, a sleeve journaled upon one of the bars, connections between the same and said second referred to hollow shaft, a pivotal lever, connections between the same and said sleeve, rods pivotally connected to the lamp brackets and mounted in one of said hollow shafts, and lever-actuated mechanism for operating said rods to cause the lamps to turn independent of the shaft in which they are mounted.

3. In combination with the side bars of an automobile, a hollow rock shaft journaled thereon, lamp brackets journaled in said shaft, a second hollow rock shaft mounted upon one of the side bars, gear connections between the shafts, a sleeve journaled upon one of the bars, connections between the same and said second referred to hollow shaft, a pivotal lever, connections between the same and said sleeve, rods pivotally connected to the lamp brackets and mounted in one of said hollow shafts, a rock shaft pivotally connected to one of said rods, and lever-actuated means for rocking the shaft which is connected to said rod.

4. In combination with the side bars of an automobile, hollow shafts journaled thereon and at right angles to each other and having gear connections with each other, lamp brackets journaled in one of said shafts, a sleeve on the side bar, having gear connections with one of the hollow shafts, a lever for rocking said sleeve, rods for tilting said brackets independent of the shaft in which they are mounted, a solid shaft journaled in one of the hollow shafts and pivotally connected to one of said rods, a solid shaft journaled in said sleeve and having gear connection with the first referred to solid shaft, and lever mechanism for rocking the shaft in said sleeve.

In testimony whereof I hereunto affix my signature in presence of two witnesses.

JOHN HENRY REED.

Witnesses:
 FRANK V. WILSON,
 JOHN WILLIAM GIROD.